June 7, 1949.    J. W. PATTON    2,472,339
SEAT, ESPECIALLY FOR RAIL CARS
Filed Jan. 15, 1945
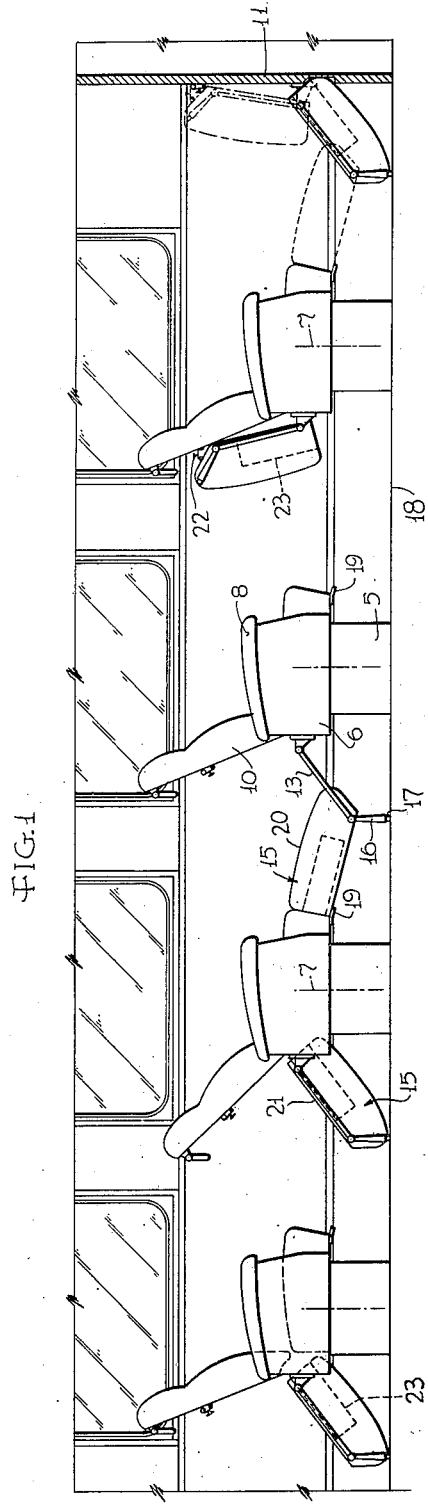
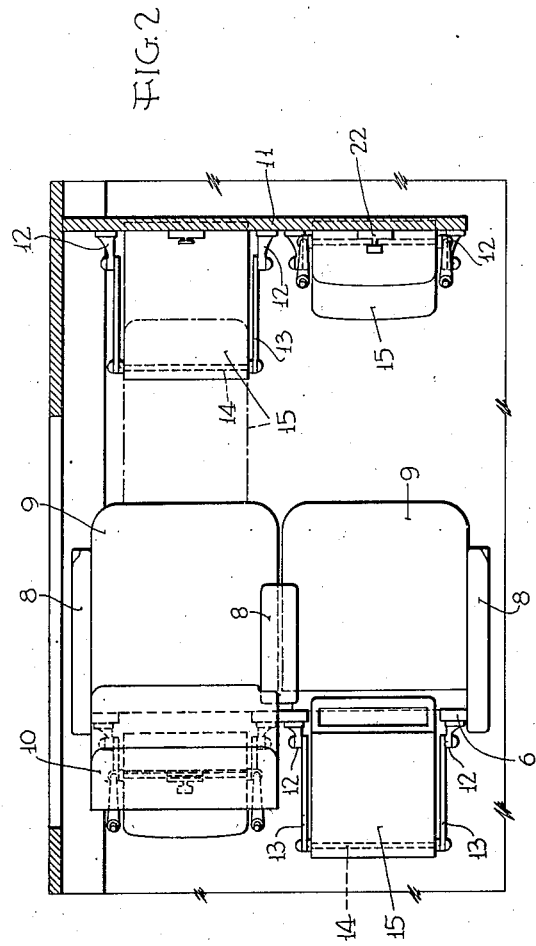
INVENTOR
John W. Patton.
BY John P. Tarbox
ATTORNEY Patented June 7, 1949

2,472,339

UNITED STATES PATENT OFFICE 2,472,339

SEAT, ESPECIALLY FOR RAIL CARS

John W. Patton, Philadelphia, Pa., assignor, by mesne assignments, to Heywood-Wakefield Company, Gardner, Mass., a corporation of Massachusetts Application January 15, 1945, Serial No. 572,773

8 Claims. (Cl. 155—171)

1

The invention relates in general to seats or chairs which are arranged in rows, the one behind the other and more specifically to seats for rail cars or other vehicles.

Still more specifically, the invention relates to improvements of the seats disclosed in the applications to Earl J. W. Ragsdale, Seating arrangement and construction, Serial No. 509,380, filed November 8, 1943, now Patent No. 2,431,661, and George Trautvetter, Vehicle seat, Serial No. 509,362, filed November 8, 1943, now Patent No. 2,432,072.

The seats and seating arrangements of the aforesaid applications are characterized by a seat cushion extension which can be folded into one position where it serves as a leg rest and into a second position where it serves as an inclined foot rest.

The outstanding object of the invention is a suspension for a seat cushion extension of the indicated type which permits the extension to be lifted entirely from the floor so as to leave the floor space between successive seats completely free and so as to permit the seats, in case they are of the revolving type, to be swung around into the opposite direction.

The means by which the aforesaid and other objects and advantages of the invention are achieved will become evident from the embodiment diagrammatically illustrated in the attached drawing and described in the following.

In the drawing:

Figure 1 is a fragmentary side elevation of the interior of a rail car adjacent one end thereof, the end wall being shown in section; and Figure 2 is a fragmentary plan view on a larger scale of the right hand pair of seats shown in Figure 1 with the side wall and the end wall in section and the back rest of the one seat omitted.

The seats shown in the drawing comprise each a base 5 secured to the floor and a structure or seat frame 6 rotatable by any well known or other appropriate means generally about a vertical axis 7 relative to the base 5. Each structure 6 is provided with arm rests 8 and carries two seat cushions 9 with appertaining back rests 10. The back rests 10 are of the reclining type and may be operated by any appropriate mechanism, of which many are well known in the art.

To the rear of each structure 6 and to the end walls 11 (of which only the one at one end of the row is shown) are secured two pairs of brackets 12 at about the height of the seat cushion 9. Journalled to each bracket is a link 13. Two adjacent links have their other ends interconnected

2 by a cross bar 14 which extends through and is journalled in a seat extension 15 of the type disclosed in the aforesaid applications. Each of the links 13 is also provided with an extension 16 which forms with the link itself an obtuse angle and has a rubber tip 17 or the like.

The links 13 may be brought in a position where the extensions 16, with their tips 17, rest on the floor 18. In this position of the links 13, the seat extension 15 may be swung into two different positions. In the one position, the extension rests on brackets 19 of the appertaining seat cushion 9 and its upholstered upper side 20 serves as a leg rest. In the other position, the seat extension 15 rests in inclined position against the seat in front or against the end wall 11 and its now upturned underside 21 serves as a foot rest.

From the last described inclined position, the extension 15 together with the links 13 may be swung about the pivots on the brackets 12 into an upright position against the back of the back rest 10 of the seat to which it is attached or the end wall 11 respectively and it may be secured there by a latch 22. The latch connection 22 is such as to allow a certain amount of relative movement between back rest 10 and the seat extension 15 so as not to interfere with the movement of the back rest which, in the illustrated embodiment, has not the same center of rotation as the links 13 on the brackets 12.

The dotted lines 23 indicated in the seat extension designate the pockets forming the subject matter of the aforesaid Patent No. 2,432,072.

The seat extensions perform all the functions of the seat extensions disclosed in the aforesaid applications. In addition, however, they may be moved entirely out of the way and permit the seats to be swung around into the opposite direction. Obviously there should be a pair of seat extensions at either end of the passenger compartment, one of which only will be used depending upon the direction into which the seats are turned.

The invention is not restricted to the details of the diagrammatically illustrated embodiment but is liable to modifications and adaptations without departing from its spirit. All such modifications and adaptations are intended to be covered by the attached claims.

What is claimed is:

1. Revolving seat, especially for vehicles, comprising a base and rotatable thereon a structure carrying the seat and back rest cushions, a seat cushion extension and foot rest, a pair of links extending in the longitudinal direction of the seat on both sides of said extension and journalled by one of their ends to a structure spaced from and located in front of the seat and by their other ends to said extension near one of the latter's margins at a location, in the position of use of the extension, about midway between the front margin of the seat cushion and said structure, means for supporting the ends of the links attached to the said extension above the floor at a lower level than the points of attachment to said structure, supporting means on said seat for the margin of said extension which is remote from the margin journalled to the links, means for holding said extension in a position upwardly inclined toward said structure so that it constitutes an inclined foot rest, and means for holding the extension and the links in generally upright position.

2. In combination with a seat, especially for vehicles, a leg and foot rest member, a pair of links extending in the longitudinal direction of the seat on both sides of said member and journalled by one of their ends to a structure spaced from and located in front of the seat and by their other ends to said member, supporting legs rigidly connected with the ends of the links attached to the said member for supporting the links above the floor, supporting means on said seat for one margin of said member when it serves as a leg rest, means for holding said member in a position upwardly inclined toward said structure so that it serves as an inclined foot rest, and means for holding the extension and the links in generally upright position.

3. Seating construction, especially for vehicles, comprising a chair and an upright structure spaced from and located in front of the chair, a combined seat cushion extension and foot rest member, a pair of links extending generally in the direction in which the chair faces and along opposite sides of said member, said links having longitudinally spaced points journalled swingably about horizontal transverse axes respectively to said structure and to said member near one of its ends, means for supporting above the floor in leg-rest position of said member the portion of the latter which is attached to said links, means on said chair supporting in the same leg-rest position the end of said member which is remote from the end journalled to the links, means for holding said member in foot-rest position upwardly inclined toward said structure, and means for holding said member and links together in generally upright inoperative position.

4. Vehicle seat comprising a seat cushion and a back rest, a seat cushion extension for a similar seat in back of said first-named seat, a pair of links journalled to the back of first-said seat and to said extension, the journals being arranged and said links and said extension having such relative lengths as to provide selective disposition of said extension alternately in continuation of the cushion of the seat in back, or in inclined position against the structure of the first-said seat to which it is attached in which it serves as foot rest for the seat in back, or in a raised out-of-the-way position against the back rest of the first-said seat to which it is attached, and means for holding said extension in the three aforesaid different positions.

5. In combination with a seat, especially for vehicles, a seat extension, a pair of arms extending in the longitudinal direction of the seat on both sides of said extension and journalled by one of their ends to a structure spaced from and located in front of the seat, the other ends of said arms carrying elements adapting them for removable support on the floor, means movably connecting said extension and said arms for holding said extension in a leg-rest position or for holding the extension together with the arms in generally upright out-of-the-way position.

6. Seating means, especially for use in vehicles and particularly adapted for revolving seats, comprising in combination with a seat, a structure located in front of the seat, a rest support hinged at one end to said structure at a distance above the floor and adapted to swing up against the structure in a non-use position or to swing down and rest on the floor at the end opposite the hinged end in the useful position, and a leg and foot rest mounted for turning movement on said rest support so as to present one side in general parallelism with the support in its useful position as a foot rest or to be turned over and present the other side at an inclination downward from the front edge of the seat as a leg rest.

7. A vehicle seat comprising a base and a structure rotatable thereon about a vertical axis, said structure carrying a seat cushion and a back rest, a seat cushion extension for use by the occupant of a similar seat behind said first-named seat, a pair of links journalled to the back of said structure and to said extension for selective positioning of the extension in continuation of the cushion of the seat behind that on which the structure is carried, or in inclined position against the structure to which it is attached to serve as foot rest for the seat behind, or in a raised position against the back rest of the seat to which it is attached in such disposition that the seat with the attached structure may be turned about the vertical axis, with the space between adjacent seats left free of obstruction, and means for holding said extension in the three aforesaid different positions.

8. In a seat arrangement, such as for rail cars, comprising a row of seats, one behind the other, each seat including a seat cushion and a back rest, a seat cushion extension for each seat journalled to a link structure and journalled by the link structure to the back of the seat or, at the end of the row, to a stationary structure in front of the seat, said link structure together with additional supporting means attached to the opposite end of the extension permitting the extension to be placed selectively substantially in continuation of the cushion of the seat behind, in inclined position against the seat or structure to which it is attached where it serves as a foot rest for the seat behind, or in a raised out-of-the-way position against the back rest of the seat or against the structure to which it is attached.

JOHN W. PATTON.

REFERENCES CITED

The following references are of record in the file of this patent:

UNITED STATES PATENTS

| Number | Name | Date |
| --- | --- | --- |
| 26,571 | Danner | Dec. 27, 1859 |
| 2,093,455 | Knight | Sept. 21, 1937 |
| 2,174,622 | Dale | Oct. 3, 1939 |

FOREIGN PATENTS

| Number | Country | Date |
| --- | --- | --- |
| 813 | Great Britain | 1911 |
| 97,234 | Switzerland | Dec. 16, 1922 |
| 375,022 | Great Britain | June 23, 1932 |